E. A. ADAMS.
HEADLIGHT CONTROLLER FOR AUTOMOBILES.
APPLICATION FILED AUG. 20, 1908. RENEWED MAR. 19, 1910.
960,763.
Patented June 7, 1910.
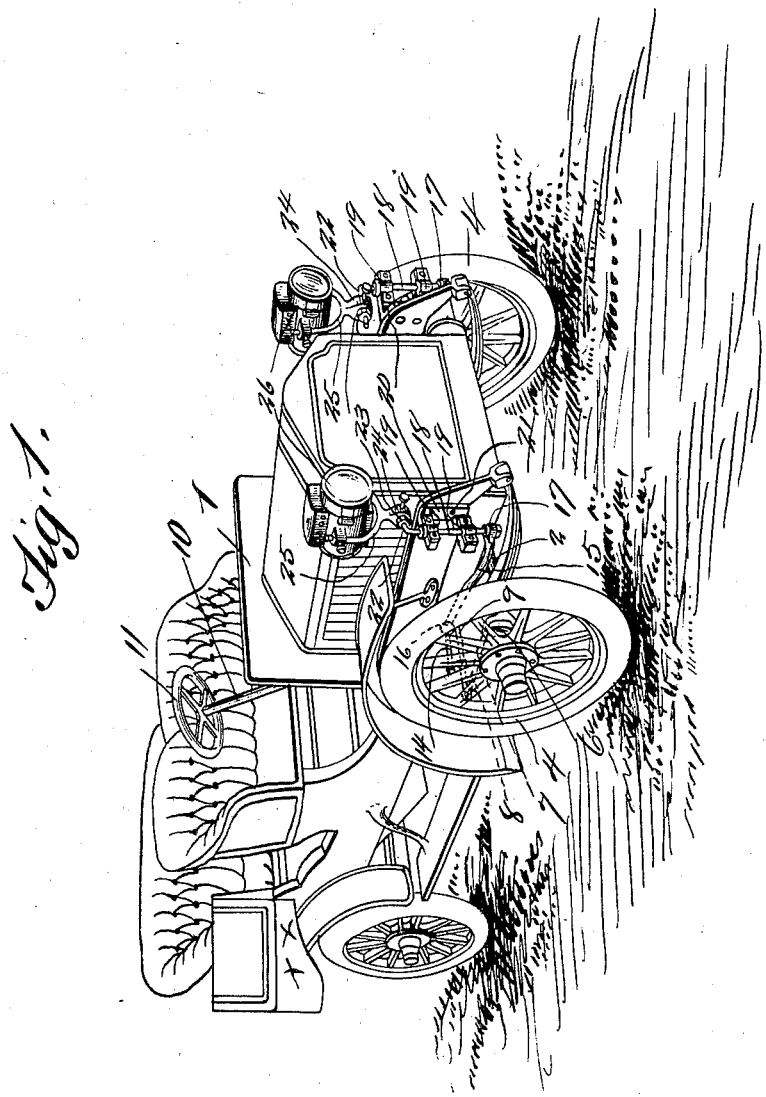

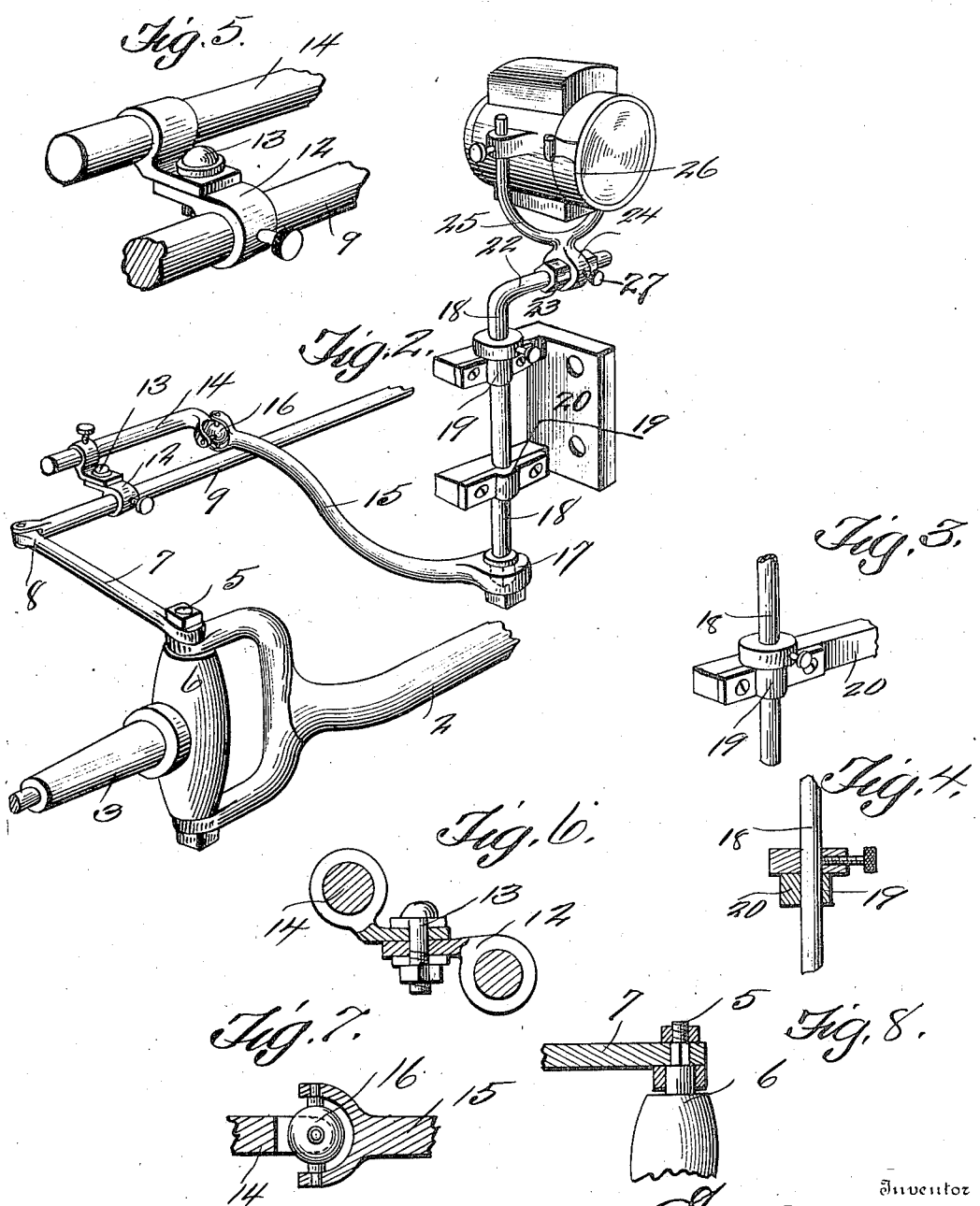

UNITED STATES PATENT OFFICE.

EDWARD A. ADAMS, OF LIBERTY, NEBRASKA.

HEADLIGHT-CONTROLLER FOR AUTOMOBILES.

960,763.  Specification of Letters Patent.  Patented June 7, 1910.

Application filed August 20, 1908, Serial No. 449,457. Renewed March 19, 1910. Serial No. 550,521.

*To all whom it may concern:*

Be it known that I, EDWARD A. ADAMS, a citizen of the United States, residing at Liberty, in the county of Gage and State of Nebraska, have invented a new and useful Headlight-Controller for Automobiles; and I do hereby declare the following to be a full, clear, and exact description of the invention, such as will enable others skilled in the art to which it appertains to make and use the same.

The invention about to be set forth pertains particularly to a new and useful headlight controller; and the object of the invention in its fundamental principles is to provide a device of this character whereby the light rays emanating from the flame of the wick or burner of the lamp or headlight may be caused to be projected in the direction of travel of the machine, whether the machine is headed for a straight course or in turning corners or around curves, thereby decreasing the danger of accidents and liability to collisions, as will be readily and clearly manifest.

The invention directs as a further object, that is specifically, to provide a device of this character having the parts thereof adjustable, for instance, the coöperating rods and levers and the lamps or headlights, the adjustability of the lamps or headlights being at angles parallel with the longitudinal sides of the machine or automobile, as seen clearly in one of the detail views of the drawings. One of the members of the lamp or headlight controller is used in addition to its other functions as a lamp or headlight support, as will be clearly evident.

This invention comprises further elements and combinations of elements, which will be hereinafter more fully described shown in the accompanying drawings, and the novel features thereof will be pointed out in the appended claim.

The features, elements, and arrangement thereof, which constitute the above entitled invention, may be changed or varied, that is to say, in an actual reduction to practice, with the understanding that the changes and variations accruing from said reduction to practice are limited to the scope of the appended claim.

To obtain a full and correct understanding of the details of construction, reference is to be had to the hereinafter set forth description and the accompanying drawings, in connection therewith, wherein:—

Figure 1 is a perspective view of an automobile illustrating the improved lamp or headlight controller applied thereto. Fig. 2 is an enlarged perspective view of one of the headlights, showing the controller mechanism which is manipulated by the steering wheel of the automobile, which controls the front wheels of an automobile. Fig. 3 is a detail view of the bearing members carried by a bracket for one of the members of the controller. Fig. 4 is a sectional view through the bearing member illustrated in Fig. 3. Fig. 5 is a perspective view of a sliding bearing member between portions of the controller mechanism. Fig. 6 is a sectional view through the view illustrated in Fig. 5. Fig. 7 is a detail sectional view of a universal joint of two of the members of the controller mechanism. Fig. 8 is a detail view, showing a portion of the fork of the axle 2, the portion of the rod or member 7, and the member 6, showing how the member 6, the said portion of the fork and the rod or member 7 are fastened together.

In regard to the drawings, wherein similar reference characters indicate corresponding parts in the several illustrations, by figures, 1 designates an automobile having the usual front axle 2 having the oscillating stub axles 3 at each end thereof, upon which the front wheels are journaled. 5 designates upward extensions of the pivot 6 of the said stub axles to which rods 7 are connected, to the free ends 8 of which the rod 9 is connected, which rod 9 is coöperated with in any suitable manner (not shown) by the shaft 10 of the steering wheel 11 of the automobile as will be seen clearly. Mounted upon the rod 9 are two adjustable bearing members 12, through which the rods or bars 14 extend, the free ends of which are connected to the bars or rods 15 by universal joints or connections 16, as seen clearly in the drawings, especial attention being directed at the detail view of this connection of the device.

The free ends of the rods or bars 15 are pivoted, as at 17, to the vertically disposed rocking shafts 18, which are mounted in suitable bearings 19, carried by the brackets 20, which are fixed by suitable bolts 21, to the front portion of the automobile, as seen clearly in Fig. 1 of the drawings.

The upper ends of the vertically disposed rocking shafts 18 are provided with lateral extensions 22, which extend at right angles to the vertically disposed rocking shafts 18, as seen clearly in Figs. 1 and 2 of the drawings, and which are provided with polygonal shaped portions 23, which are engaged by bearings or members 24, which are carried by the U-shaped supporting brackets 25, which brackets are designed for the purpose of holding or supporting the lamps or headlights 26 of the automobile, as seen clearly in Fig. 1; the bearings or members 24 are provided with thumb screws 27 and by loosening said thumb screws the bearings or members 24 may be removed from the polygonal shaped portion, after which the said bearings or members may be reëngaged upon said polygonal shaped portions, in such wise as to dispose the lamps or headlight at different angles, as will be seen clearly in the drawings.

By the manipulation of the steering wheel and its shaft the rod 9, is operated through the medium of the connection between said rod 9 the front wheels of the automobile are turned in the desired direction, and at the same time the wheels are turned the lamps or headlights are moved in unison, and the same direction as the wheels are turned, through the medium of the several rods forming the connection between the lamps or headlights and the rod 9, as will be clearly manifest.

From the foregoing the essential features, elements and the operation of the device, together with the simplicity thereof, will be clearly apparent.

Having thus fully described the invention, what is claimed as new and useful by the protection of Letters Patent, is:—

The combination of the steering mechanism of a vehicle, lamps or headlights, connections between the steering mechanism and the headlights, said connections consisting of pivoted vertical supporting shafts having laterally extending arms provided with polygonal shaped portions to which the lamp yokes are detachably and adjustably secured, crank rods connected to the shafts, horizontally extending rods, universal joints connecting the crank arms and rods, and adjustable clamp connections between the rods and the transverse bar of the steering mechanism.

In testimony whereof I have signed my name to this specification in the presence of two subscribing witnesses.

EDWARD A. ADAMS.

Witnesses:
D. W. MARTIN,
F. R. BELWILLE.